United States Patent
Quan et al.

(10) Patent No.: US 10,684,838 B2
(45) Date of Patent: Jun. 16, 2020

(54) DYNAMIC APPLICATION DEPLOYMENT

(71) Applicant: Razer (Asia-Pacific) Pte. Ltd., Singapore (SG)

(72) Inventors: Justin Quan, San Francisco, CA (US); Michael A. Chan, San Francisco, CA (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 248 days.

(21) Appl. No.: 14/836,032

(22) Filed: Aug. 26, 2015

(65) Prior Publication Data

US 2015/0365463 A1 Dec. 17, 2015

Related U.S. Application Data

(63) Continuation-in-part of application No. 14/158,733, filed on Jan. 17, 2014, now Pat. No. 9,210,203, which
(Continued)

(51) Int. Cl.
*G06F 8/61* (2018.01)
*H04L 29/06* (2006.01)
(Continued)

(52) U.S. Cl.
CPC ............ *G06F 8/61* (2013.01); *G06F 9/44521* (2013.01); *G06F 9/455* (2013.01);
(Continued)

(58) Field of Classification Search
CPC ..... H04L 67/34; H04L 67/10; H04L 67/1095; H04L 67/2842; H04L 67/025; H04L 67/06; H04L 47/2441; H04L 67/42; H04L 65/60; H04L 67/02; H04L 29/08072; H04L 41/0869; H04L 43/0894; H04L 43/16;
(Continued)

(56) References Cited

U.S. PATENT DOCUMENTS 8,510,577 B2 * 8/2013 Scott ..................... G06F 1/3209
 713/300
8,572,178 B1 * 10/2013 Frazzini .................... G06F 9/54
 709/205
(Continued)

*Primary Examiner* — Djenane M Bayard
(74) *Attorney, Agent, or Firm* — Mattingly & Malur, PC

(57) ABSTRACT

In some examples, an electronic device may offload an application to network storage. Subsequently, if a user attempts to execute the application on the electronic device, the application may be executed remotely while the application is downloaded to the electronic device. As one example, a remote computer may use an emulator to execute the application and send application execution data to the electronic device. The user may interact with the remotely executing application while the application is downloaded and reinstalled on the electronic device. Application state information may be obtained from the remotely executing application and used to initiate execution of the application locally on the electronic device. As another example, a web application version of the application may be executed remotely and accessed through a browser on the electronic device while the application is downloaded and reinstalled on the electronic device.

23 Claims, 10 Drawing Sheets

Related U.S. Application Data is a continuation-in-part of application No. 13/865,515, filed on Apr. 18, 2013, now Pat. No. 9,374,407.

(60) Provisional application No. 61/708,794, filed on Oct. 2, 2012.

(51) Int. Cl.
*H04L 29/08* (2006.01)
*G06F 9/445* (2018.01)
*G06F 9/455* (2018.01)

(52) U.S. Cl.
CPC ........ *H04L 65/4084* (2013.01); *H04L 65/602* (2013.01); *H04L 67/06* (2013.01); *H04L 67/34* (2013.01); *H04L 67/303* (2013.01)

(58) Field of Classification Search
CPC ....... H04L 47/56; H04L 47/801; H04L 63/08; H04L 67/2804; H04L 65/602; H04L 67/2823; H04L 69/22; H04L 1/0061; H04L 65/4076; H04L 67/2819; H04L 1/0041; H04L 1/0058; H04L 63/0428; H04L 63/083; H04L 63/10; H04L 41/0806; H04L 41/5009; H04L 41/5038; H04L 41/5096; H04L 43/04; H04L 47/70; H04L 63/061; H04L 67/1008; H04L 67/20; H04L 9/14; H04L 2463/062; H04L 2463/101; H04L 67/1097; H04L 47/10; H04L 67/32; H04L 9/3247; H04L 12/2834; H04L 45/742; H04L 49/252; H04L 63/0464; H04L 63/0471; H04L 63/168; H04L 65/1069; H04L 67/306; H04L 9/30; H04L 9/3271; H04L 2209/80; H04L 29/08801; H04L 29/08891; H04L 41/0816; H04L 41/142; H04L 41/16; H04L 43/062; H04L 43/0882; H04L 47/803; H04L 63/0823; H04L 63/0853; H04L 63/107; H04L 67/141; H04L 67/2847; H04L 67/2852; H04L 67/2885; H04L 12/1421; H04L 1/0071; H04L 27/12; H04L 41/12; H04L 43/0852; H04L 43/0888; H04L 45/245; H04L 47/2475; H04L 47/762; H04L 47/785; H04L 51/10; H04L 5/0007; H04L 5/0032; H04L 63/06; H04L 63/20; H04L 65/1083; H04L 65/403; H04L 65/80; H04L 67/18; H04L 67/26; H04L 67/28; H04L 67/322; H04L 69/08; H04L 69/16

See application file for complete search history.

(56) References Cited

U.S. PATENT DOCUMENTS

| | | | | |
|---|---|---|---|---|
| 2002/0073180 | A1* | 6/2002 | Dewhurst | G06F 17/5018 709/220 |
| 2003/0093774 | A1* | 5/2003 | Hilton | G06F 9/45504 717/138 |
| 2010/0299187 | A1* | 11/2010 | Duggal | G06Q 10/10 705/14.1 |
| 2011/0172986 | A1* | 7/2011 | Yaffe | G06F 9/452 703/26 |
| 2012/0079080 | A1* | 3/2012 | Pishevar | A63F 13/12 709/220 |
| 2012/0303778 | A1* | 11/2012 | Ahiska | H04L 67/2852 709/223 |
| 2013/0183935 | A1* | 7/2013 | Holostov | H04W 12/06 455/411 |
| 2013/0227521 | A1* | 8/2013 | Bourd | G06F 11/3604 717/110 |

* cited by examiner

DYNAMIC APPLICATION DEPLOYMENT

CROSS-REFERENCES TO RELATED APPLICATIONS

This application is a continuation-in-part of U.S. patent application Ser. No. 14/158,733, entitled "RESOURCE BASED MOBILE DEVICE APPLICATION STREAMING", filed on Jan. 17, 2014, which is a continuation-in-part of U.S. patent application Ser. No. 13/865,515, entitled "MOBILE DEVICE APPLICATION STREAMING", which was filed on Apr. 18, 2013, which claims the benefit of U.S. Provisional Patent Application No. 61/708,794, entitled "CLOUD COMPUTING INTEGRATED OPERATING SYSTEM", which was filed on Oct. 2, 2012, all of which applications are incorporated by reference herein.

BACKGROUND

People use electronic devices for communication, socializing, entertainment, work, navigation, web browsing, and a variety of other functions. However, electronic devices typically have limited storage space, thus restricting the amount of data that a user may maintain on a particular electronic device. For example, people often keep various different types of digital content items on their electronic devices, such as photographs, videos, music, and so forth, and like to have sufficient free storage space to allow addition of more content items when desired without having to first delete existing content items. Furthermore, people may often have many applications installed on their electronic devices. Some of these applications and associated application data may take up a considerable amount of storage space, while being used relatively infrequently.

SUMMARY

Some implementations herein include techniques and arrangements for managing applications available to a user on an electronic device. For instance, an application management module may remove an application from the electronic device, and may store the application and associated data at a network-accessible storage location. Subsequently, when the user attempts to execute the application on the electronic device, the application may be executed remotely by a service computing device while the application is also downloaded to the electronic device. As one example, the service computing device may use an emulator to execute the application and send application execution data to the electronic device. For instance, the emulator may emulate execution of the application on the electronic device. The user may interact with the remotely executing application while the application is been downloaded and reinstalled on the electronic device. Application state information may be obtained from the remotely executing application and used to initiate execution of the application locally on the electronic device so that local execution may resume at a point at which remote execution left off.

As another example, a web application version of the application may be executed remotely and accessed through a browser on the electronic device while the application is downloaded and reinstalled on the electronic device. As still another example, the application may be divided into individually executable fragments and one or more of the fragments may be downloaded to the electronic device so that execution of the application may begin while either the remainder of the fragments or the original application are downloaded to the electronic device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
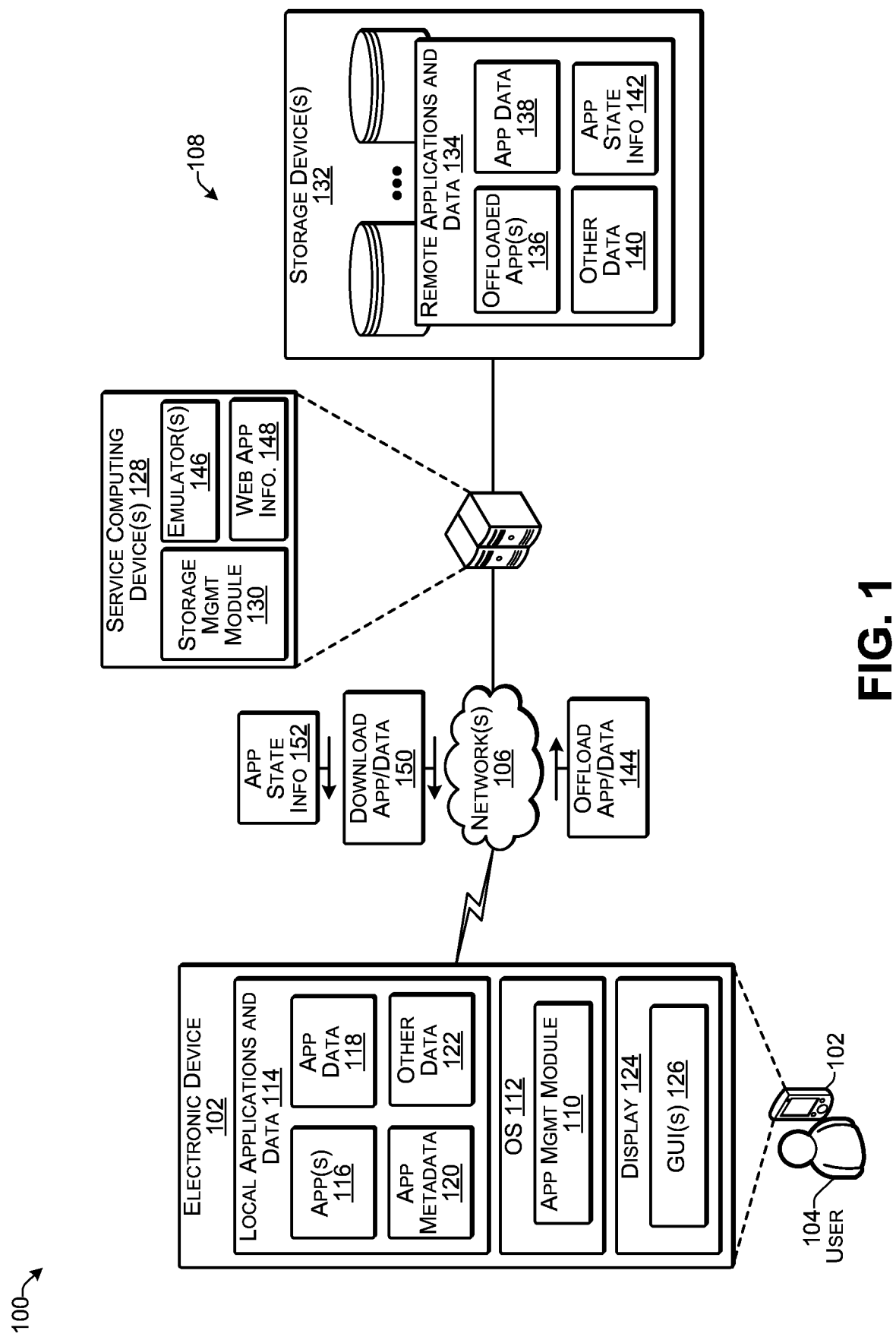
FIG. 1 illustrates an example system for enabling application management on an electronic device according to some implementations.

Some examples herein are directed to management of applications on an electronic device. For instance, an electronic device may dynamically manage the amount of available storage on the electronic device by removing some applications from the storage of the electronic device. An application may be offloaded and maintained at a remote network-accessible storage, such as a cloud storage or other network storage location. As one example, a copy of the offloaded application and associated application data may be stored at the network storage in association with a cloud storage account of a user of the electronic device. Thus, certain applications that are used less frequently and/or that utilize a large amount of storage space may be automatically offloaded to the network storage location. For example, an application may be offloaded based on expiration of a threshold length of time since the last use, based on the application using a threshold amount of storage space, based on a threshold amount of storage space remaining on the electronic device, and/or based on other criteria.

Subsequently, when the user attempts to invoke execution of an application that has been offloaded from the electronic device, the application may be executed on a remote computing device while the application is being downloaded and reinstalled on the electronic device. Accordingly, the user may begin using the application right away through execution on the remote computing device, rather than having to wait for the application to be downloaded and reinstalled on the electronic device. After the application has been downloaded and reinstalled on the electronic device, execution of the application may be transitioned from remote execution to local execution. As part of the transition, the application states between the remote version of the application and the local version of the application may be synchronized so that the local execution of the application on the electronic device may use the synchronized state.

In some examples, the application may be executed on the remote computing device using an emulator that emulates an environment of the user's electronic device. For instance, if the electronic device is a mobile electronic device, the emulator may emulate the mobile electronic device environment, such as by emulating the operating system (OS) version and hardware resources of the particular mobile electronic device. Accordingly, the state of the application that is executed on the remote computing device may be matched to the state of the application that is executed on the electronic device when the application has been reinstalled and is ready to be executed locally on the electronic device.

When transitioning execution of the application from the remote execution on the remote computing device to local execution on the electronic device, the state of the application may be determined explicitly or implicitly. In the explicit technique, a module on the electronic device may request that the application provide application state information for synchronization. For instance, as an example of an explicit technique, the request for the application state information and the receiving of the application state information may be performed by a module of the OS on the electronic device using one or more application programming interfaces (APIs).

Alternatively, as an example of an implicit technique, when the application is ready for local execution on the electronic device, a message may be sent to the remote computing device. In response, a module on the remote computing device may cause the OS on the remote computing device to push the remotely executing application from a foreground process to a background process. Being pushed to a background process typically may cause the application to save (e.g., in an associated application folder) application data corresponding to the current execution state of the application. The saved application data may be sent to the electronic device or may be otherwise used to synchronize the states between the remotely executed version and the local version of the application.

As another example, rather than using an emulator on a remote computing device, a web application version of the application may be executed on a remote computing device while the application is downloaded and reinstalled on the electronic device. For example, some applications have web application versions that can be executed, e.g., through communication with a browser on the user's electronic device. Thus, while the web application is executing on the remote computing device and communicating with the browser on the user's electronic device, the application may be downloaded for installation and local execution on the electronic device. When the application has been downloaded and installed on the electronic device, a module on the electronic device may obtain the application state from the web application, such as through an API or other suitable technique.

As another example, the application may be divided into a plurality of application fragments that enable the electronic device to execute a portion of the application locally before the whole application has been downloaded to the electronic device. For instance, a server or other processing computing device may initially decompose an offloaded application into a plurality of application fragments. Each application fragment may be able to be executed individually without the remainder of the application being present. For example, each application fragment may correspond to one or more user GUIs, such as activities in an ANDROID™ environment or views in an iOS environment. Application assets such as images, text, videos, audio, 3D models, and the like, may be determined for each GUI, and the application assets that are used for a specific GUI may be included within a corresponding fragment when the fragment is sent to the electronic device. The processing computing device may also determine a probable order of execution of the fragments and any dependency relationships between the fragments.

An application can be launched on the user's electronic device by sending one of more fragments of the application to the electronic device without having to send the entire application. Additional fragments may be sent to the electronic device in an order based on the predicted order of use of the fragments and/or dependencies between the fragments. For example, the processing computing device may determine the probability of each fragment being used based on user access patterns determined for a plurality of users of the application. In some implementations, when all fragments of the application have completed downloading to the electronic device, the fragments of the application may be retrieved from the local storage as needed for execution. In other implementations, the non-fragmented version of the application may be downloaded to the electronic device while the fragment is being executed, and local execution may be transitioned from the fragment to the non-fragmented version of the application.

For discussion purposes, some example implementations are described in the environment of offloading and subsequently reinstalling applications on the electronic device for conserving storage space on the electronic device with minimal disruption to the user experience. However, implementations herein are not limited to the particular examples provided, and may be extended to other types of devices, other execution environments, other system architectures, other techniques for remote application execution, other techniques for determining application states, and so forth, as will be apparent to those of skill in the art in light of the disclosure herein.

FIG. 1 illustrates an example system 100 for enabling management of applications according to some implementations. For instance, the system 100 may enable an electronic device 102 associated with a user 104 to communicate over one or more networks 106 with a network storage 108. The electronic device 102 may be any suitable type of computing device, e.g., mobile, semi-mobile, semi-stationary, or stationary. Some examples of the electronic device 102 may include smart phones, tablet computing devices, wearable computing devices, body-mounted computing devices, and other types of mobile devices; laptops, netbooks, and other mobile computers or semi-mobile computers; desktop computing devices, terminal computing devices and other semi-stationary or stationary computing devices; augmented reality devices, gaming systems, or any of various other computing devices capable of storing data, sending communications, and performing the functions according to the techniques described herein. Further, while a single user 104 and associated electronic device 102 are illustrated in this example, in other examples, there may be a large number of users 104, each having one or more respective electronic devices 102.

The electronic device 102 may include an application (app) management module 110 that executes on the electronic device 102. The application management module 110 may provide application management functionality to the electronic device 102 for controlling which applications are maintained locally on the electronic device 102. In some examples, the application management module 110 may be one or more modules of an operating system (OS) 112 on the electronic device 102. In other examples, the application management module 110 may be one or more modules that are separate from the OS 112, such as may be included in one or more applications executable on the electronic device 102. For instance, the application management module 110 may have permission for system-level access to user applications and/or data stored on the electronic device 102. In addition, while the application management module 110 is illustrated in this example as residing on the electronic device 102, in other examples, at least some of the functionality of the application management module 110 may reside on another suitable computing device.

The electronic device 102 may further include local applications and data 114, which may include one or more applications 116 that are installed and maintained locally on the electronic device 102. The local applications and data 114 may further include application data 118, which may be application data that is associated with particular applications of the applications 116. In some examples, the local applications and data 114 may further include application metadata 120, which may include metadata for both local applications and offloaded applications, as discussed additionally below. In addition, the local applications and data 114 may include other data 122. Examples of other data 122 may include content items, such as photographs, images, videos, audio recordings, documents, and the like, as well as other types of user data, data used by the OS 112, and/or data used by other programs on the electronic device.

In addition, the electronic device 102 may include a display 124 for presenting various types of visual information to the user, such as one or more graphic user interfaces (GUIs) 126, as well as content items, text, images, or other information. Further, while several components and data of the electronic device 102 are described and illustrated in this example, numerous other components and data may be included in the electronic device 102, as discussed additionally below and/or as will be apparent to those of skill in the art having the benefit of the disclosure herein.

In the illustrated example, the network storage 108 includes one or more service computing devices 128 that include a storage management module 130. Further, the service computing device 128 may include, or may be in communication with, one or more storage devices 132, such as by direct connection or via the one or more networks 106. In some examples, the network storage 108 may be provided by a service provider. For instance, various service providers may provide commercial cloud storage or other network storage to the public, typically for a monthly or yearly fee based at least in part on the amount of storage space consumed by an individual user. However, implementations herein are not limited to commercial network storage services, and may be extended to other types of network-accessible storage and storage services. As several alternative examples, the network storage 108 may be a network-attached storage (NAS), a server computing device, a desktop computing device, or the like, such as may be maintained by the user 104 or other entity.

The one or more networks 106 can include any suitable network, including a wide area network, such as the Internet; a local area network, such as an intranet; a wireless network, such as a cellular network; a local wireless network, such as Wi-Fi; close-range wireless communications, such as BLUETOOTH®; a wired network, such as fiber or Ethernet; or any other suitable network, or any combination thereof. Accordingly, the one or more networks 106 may include both wired and/or wireless communication technologies. Components used for such communication technologies can depend at least in part upon the type of network and/or the environment selected. Protocols for communicating over such networks are well known and will not be discussed herein in detail. Accordingly, the electronic device 102 and the service computing device 128 are able to communicate over the one or more networks 106 using wired or wireless connections, and combinations thereof.

The storage management module 130 on the service computing device 128 may manage the storage of remote applications and data 134 of the user 104 stored on the storage devices 132, and may control access to the remote applications and data 134. In the case that the network storage 108 is provided by a commercial storage service, the storage devices 132 may be enterprise level storage arrays, such as may be maintained in a storage area network, a NAS cluster, a RAID (redundant array of independent disks) array, a distributed storage node array, or various other types of storage configurations. The storage devices 132 may store offloaded applications 136 that have been offloaded from the electronic device 102, as well as associated application data 138. In addition, the storage devices 132 may store other data 140 of the user, such as backup versions or original versions of the user's content items and/or various other user data. In addition, the storage devices 132 may store, at least temporarily, application state information 142 for the offloaded applications 136, such as when transitioning from remote execution of an application to execution of the application on the electronic device 102.

In some implementations, the application management module 110 may dynamically manage the amount of available storage on the electronic device 102 by offloading some applications from the electronic device 102. Thus, the application management module 110 may create space in the local storage by moving one or more applications 116 off the electronic device 102 for storage at the network storage 108. In some cases, the application management module 110 may automatically offload the applications 116 to the network storage 108, such as based on one or more user preferences or various other criteria. In other cases, prior to moving one or more applications 116 off the electronic device 102, the application management module 110 may present the user 104 with a list of applications to be offloaded and the user 104 may approve, disapprove, or otherwise determine the applications to be offloaded from the electronic device 102.

The application management module 110 may take into consideration one or more criteria when determining which applications 116 to offload or to recommend for offloading. For instance, based on one or more user data usage models, priority rules, expressed user preferences, or other application ranking techniques, the application management module 110 may determine which applications 116 are likely to be used by the user 104 in the near future and which applications 116 may be offloaded. As one example, the application management module 110 may rank the applications 116, based at least in part on how recently each application has been used, how often each application is used, how much storage space each application uses, or a combination thereof. For instance, certain applications that are used less frequently and/or that utilize a large amount of storage space may be automatically offloaded to the network storage location or recommended for offloading. Thus, an application may be offloaded based on expiration of a threshold length of time since the last use, based on how frequently the application has been used over a period of time, based on the application using a threshold amount of storage space, based on the amount of storage space remaining on the electronic device falling below a threshold level, or the like.

As another example, the application management module 110 may recommend or otherwise select for offloading one or more applications 116 based on upcoming events or lack thereof. For instance, if a user typically uses certain applications on a flight, during travel, or during other events in similar event categories, the application management module 110 may recommend that those applications 116 and associated application data 118 be offloaded if the user 104 does not have any upcoming travel scheduled.

As indicated at 144, a selected application 116 and associated application data 118 may be offloaded to the network storage 108. In some cases, the offloading may take place when the electronic device is otherwise not in use, such as when the electronic device 102 is in a standby mode, connected to Wi-Fi, and plugged in to a power source. Some metadata 120 corresponding to the offloaded application may be maintained at the electronic device 102, such as for maintaining user settings, an application icon, and/or other information about the offloaded application.

The storage management module 130 at the network storage 108 may receive an offloaded application 136 and the associated application data 138 and may store these in association with a user account associated with the user 104 and/or the electronic device 102. As one example, a copy of the application and associated application data may be stored at the network storage location in association with a cloud storage account of a user of the electronic device. In some cases, at least some metadata associated with the offloaded application 136, such as user settings for the application, may also be stored at the network storage 108, such as with the application data 138. Thus, when the offloaded application 136 is executed remotely, the user settings may be applied.

Further, in some examples, when an application is offloaded, the storage management module 130 may determine settings for an emulator 146 at the service computing device 128 that may be used to execute the offloaded application 136. For instance, the storage management module 130 may determine the processing capabilities of the electronic device 102, such as by determining a device type of the electronic device, a manufacturer or brand of the electronic device, a model of the electronic device, a processor of the electronic device (e.g., processor type or processing capability), a memory size of the electronic device, an operating system of the electronic device, and/or other types of device information, device resources, and the like. Based on this determination, the storage management module 130 may determine that a suitable emulator 146 is available for executing the offloaded application 136 in a manner that will emulate execution of the application on the electronic device, at least in a manner similar enough so that application state information produced using the emulator can be used by the application when executed locally on the electronic device 102. For instance, the application state information may enable the application executed on the electronic device 102 to resume execution at a point at, or near to, that at which remote execution of the application is suspended.

In other examples, rather than using the emulator 146, the storage management module 130 may determine whether there is a web application that corresponds to the offloaded application 136. For instance, the application management module 110 may determine a link to the web application at a web server (not shown in FIG. 1) or other network location at which the web application is hosted. In other examples, where permitted, the storage management module 130 may obtain a copy of the web application for local execution on the service computing device 128. Thus, the link to the web application and/or the downloaded web application obtained from the web server may be maintained at the service computing device 128 and/or on the storage devices 132 as web application information 148.

Subsequently, when the user 104 of the electronic device 102 attempts to execute an offloaded application 136, the application management module 110 may request download of the offloaded application 136. As indicated at 150, the offloaded application and the associated application data may be sent to the electronic device 102 for reinstallation on the electronic device 102. Furthermore, while the application and application data are being downloaded to, and reinstalled on, the electronic device 102, the application may be executed remotely, e.g., on the service computing device 128, either through execution of the application on the emulator 146, or by execution of the web application version through use of the web application information 148. Accordingly, the user may begin using the application right away, rather than having to wait for the application to be downloaded and reinstalled on the electronic device 102.

After the application has been downloaded and reinstalled on the electronic device 102, execution of the application may be transitioned from remote execution to local execution. As part of the transition, the application states between the remote version and the local version of the application may be synchronized. For instance, application state information 152 may be sent by the service computing device 128 to the electronic device 102. In some cases, one or more APIs may be used to obtain and communicate the application state information 152 to the application management module 110. In other cases, the storage management module 130 may determine the application state information 152 and may send this application state information 152 to the electronic device 102. When the application management module 110 has received the application state information 152, local execution of the application on the electronic device 102 may be performed using the application state information 152 to start local execution of the program at a point at which the remote execution left off.

Figure 2:
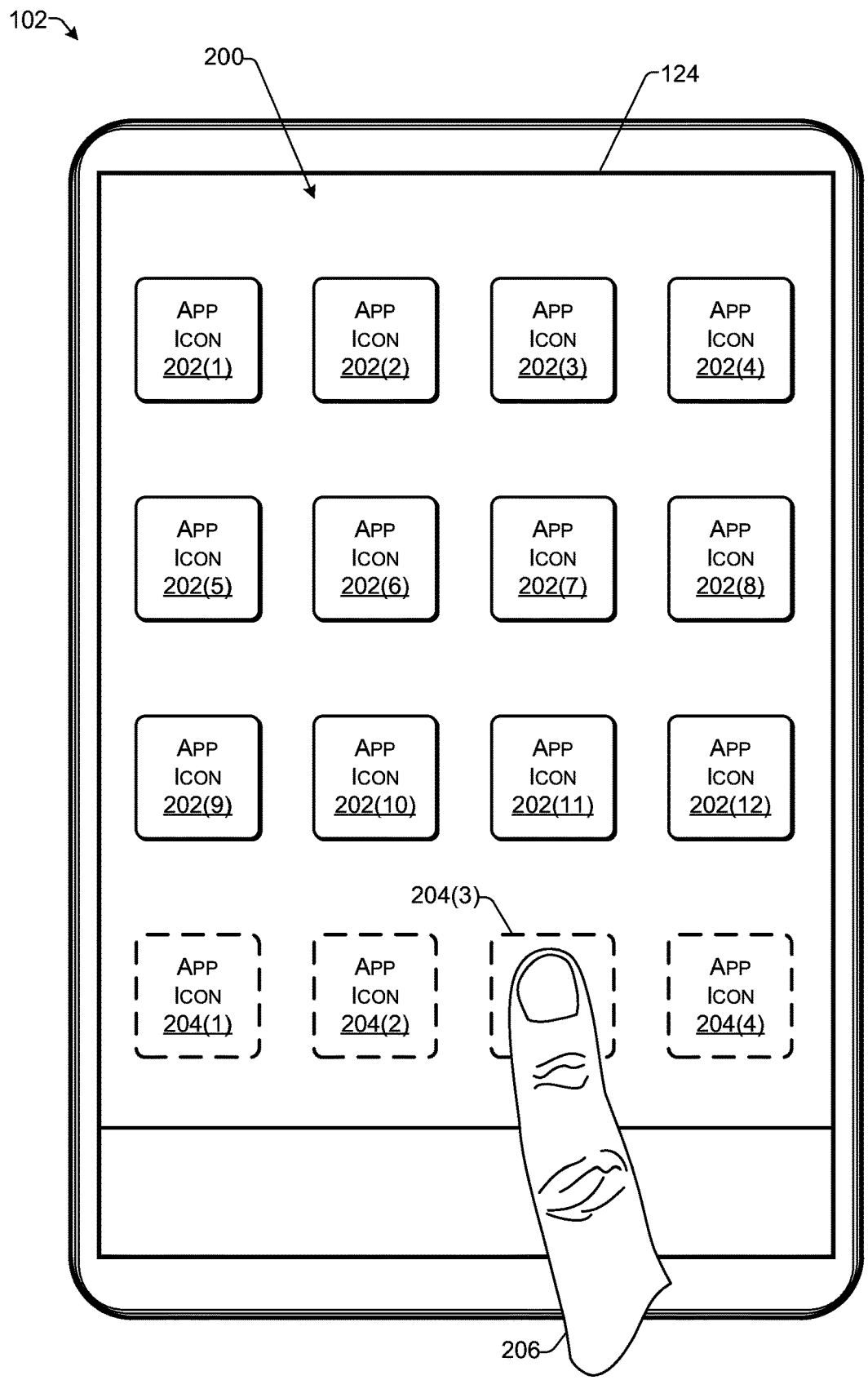
FIG. 2 illustrates an example graphic user interface (GUI) for managing applications according to some implementations.

FIG. 2 illustrates an enlarged example view of the electronic device 102 with an example GUI 200 presented on the display 124 according to some implementations. The GUI 200 may be presented to enable the user 104 to execute, access, or otherwise select a particular application of a plurality of applications. In the illustrated example, the GUI 200 presents a first plurality of application icons 202 that may represent applications that are currently installed on the electronic device 102, such as icons 202(1)-202(12), which may represent twelve respective applications that are installed on the electronic device 102. Furthermore, the GUI 200 presents a second plurality of application icons 204 that may represent applications that have been offloaded to the network storage. In this example, there are four application icons 204(1)-204(4) that represent four applications that have been offloaded to the network storage.

In some cases, following offloading of a particular application to the network storage, the icon 204 representing the offloaded application may remain in the GUI 200 to enable the user to select the offloaded application for execution. As one example, the application icon 204 may be changed to indicate that the application has been moved to the network storage, such as by placing a cloud symbol on the icon, graying out the icon, showing the icon with dashed or broken lines, or the like. In the illustrated example, the icons 204(1)-204(4) are presented with dashed lines to indicate to the user that the corresponding applications have been offloaded. In other examples, the icons 204 representing the offloaded applications may be moved to a different location in the GUI 200, such as to a folder for applications that have been offloaded from the electronic device 102. As another example, the application icons 204 may be unchanged from the application icons 202 so that it is not readily apparent to the user that a particular application has been offloaded to the network storage.

In some implementations, one or more additional GUIs (not shown in FIG. 2) may enable the user to interact with the electronic device 102 for additional application management on the electronic device 102. For instance, the user may have an opportunity to select particular applications to be offloaded from the electronic device 102. As one example, a GUI may present a plurality of applications recommended for offloading in a ranked order, such as based on infrequency of use, amount of storage space consumed, or other criteria, as enumerated above. For instance, a least frequently used application may be listed first, a next least frequently used application may be listed second, and so forth. Further, in some examples, the applications recommended or selected for offloading may consume an amount of storage space in excess of a threshold amount so that it is worthwhile to offload the applications.

In other examples, rather than presenting recommended applications for user selection and/or approval, the application management module may proceed with offloading recommended applications according the ranked order. As still another example, the electronic device may automatically and dynamically offload an application when a threshold minimum level of remaining free storage space is reached. For example, suppose that the user is using the electronic device to take photographs or video. Further, suppose that the electronic device 102 determines that that the user is close to running out of storage space on the electronic device 102, e.g., has arrived at a threshold amount of remaining storage capacity. If the electronic device 102 is able to communicate with the network storage, the electronic device 102 may proceed with offloading one or more applications, such as by a background process, based on the ranking criteria discussed above or other suitable criteria.

Further, in some examples, the user may specify how long applications are to be retained at the remote storage before being permanently deleted. For example, if the application has been at the remote storage for a year (or other specified time) after offloading, and has not been used by the user during that time, the storage management module or the application management module may inform the user that the application will be permanently deleted and/or may proceed with permanently deleting the application and associated application data from the network storage and the electronic device 102.

In the case that the display 124 is a touchscreen, the user may be able to use a finger 206 to scroll the GUI 200 to view other application icons 202 and/or 204. Additionally, the GUI 200 may include content item icons, system controls, folders, and the like (not shown in FIG. 2). Further, the user may use the finger 206 to tap on or otherwise select a particular application icon 202 or 204 to invoke execution of the corresponding application. Thus, in the illustrated example, suppose that the user has selected application icon 204(3), which corresponds to a particular offloaded application. In response, the particular offloaded application may be executed such as described below with respect to FIGS. 3-5.

Figure 3:
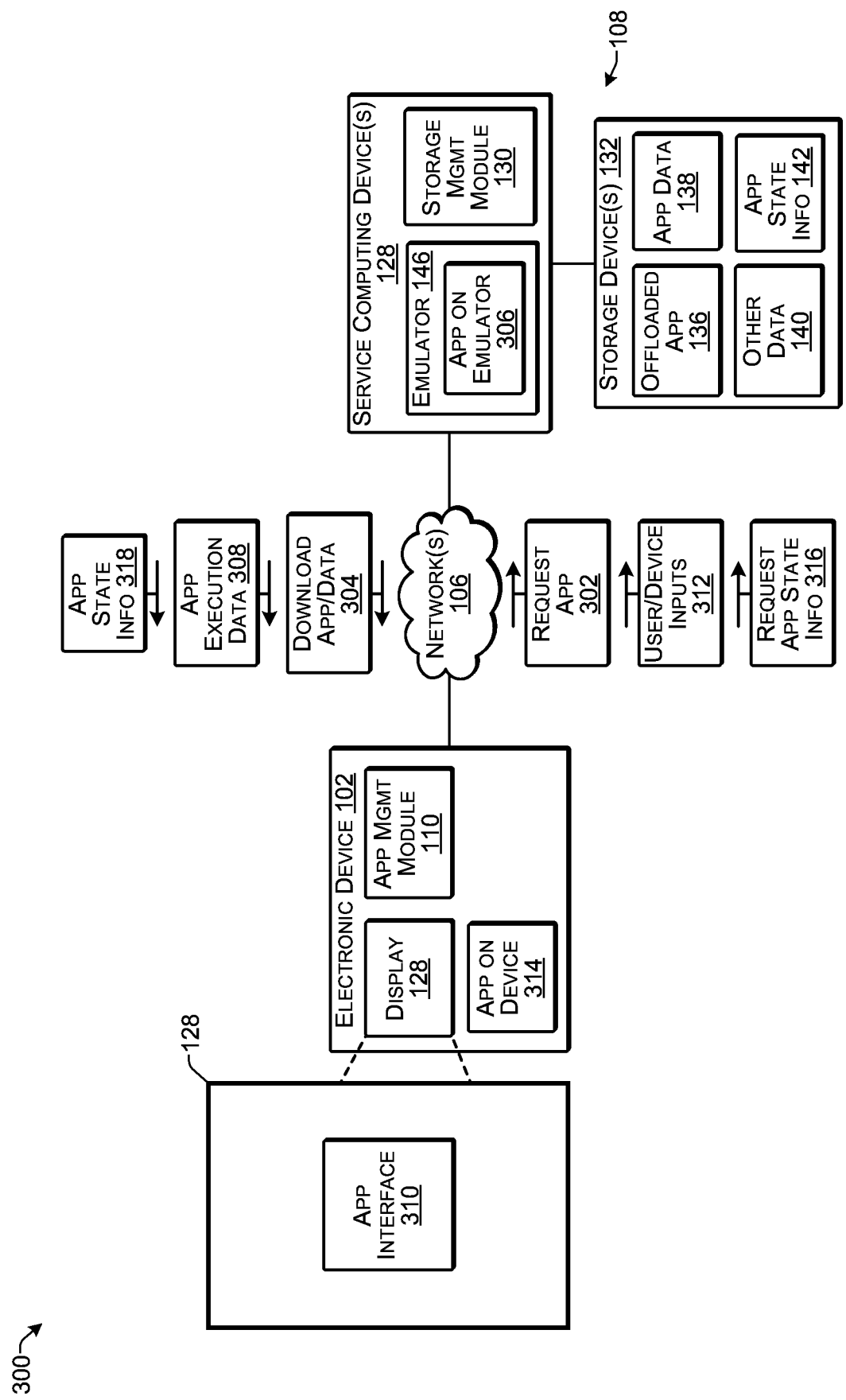
FIG. 3 illustrates an example system for using an application remotely and locally according to some implementations.

FIG. 3 illustrates an example system 300 that may correspond, at least in part, to the system 100 discussed above according to some implementations. For instance, the system 300 may enable execution of an offloaded application remotely while the offloaded application is being downloaded and installed on the electronic device for local execution. In this example, suppose that the user has invoked execution of an application on the electronic device 102, such as by tapping on an icon as discussed above with respect to FIG. 2, or using any other suitable technique for initiating execution of an application that has been offloaded from the electronic device 102. In response, the application management module 110 may send a request 302 to the service computing device 128 for the corresponding offloaded application 136 to be sent to the electronic device 102. In response, as indicated at 304, the storage management module 130 may download or otherwise send the offloaded application 136 and the associated application data 138 for the offloaded application 136 to the electronic device 102.

In addition, the storage management module 130 may cause an appropriate emulator 146 to begin execution of the offloaded application 136. In some examples, the storage management module 130 may determine the type of electronic device 102 from which the request 302 for the application 136 is received, the device resources, OS version, etc., and may select the appropriate emulator 146 to execute the offloaded application 136. Thus, as indicated at 306, the application 136 may be executed using the emulator 146 to produce application execution data 308. Depending on the type and properties of the particular application 136, the application execution data 308 may include one or more GUIs, images, text, videos, 3D models, data structures, and so forth. The application execution data 308 may be sent to the electronic device 102 for presentation in an application interface 310 on the display 128 of the electronic device 102.

In some implementations, a remote desktop protocol or other remote application protocol may be used between the storage management module 130 and the application management module 110 for communicating and presenting the application execution data 308. Further, user inputs and/or device inputs 312 may be sent by the application management module 110 from the electronic device 102 to the service computing device 128, such as via the remote desktop protocol or other remote application protocol. Accordingly, the user may interact with the application interface 310 in a manner similar to interacting with the application as if the application were executing on the electronic device 102.

After the application has completed being downloaded to the electronic device, the application management module 110 may install the application locally on the electronic device 102, as indicated at 314. Following installation of the application 314 on the electronic device 102, the application management module 110 may initiate a transition from remote execution of the application 306 at the service computing device 128 to local execution of the application 314 on the electronic device 102. The timing for the transition may depend in part on the nature of the application 314. For example, if the application is a game with which the user is constantly interacting, the transition may wait until the user reaches a natural break, e.g., finishing a level, or the like. On the other hand, if the application has a user interface in which the user experience would not be affected much by a pause in function, then the transition may begin after the installation of the application 314 on the electronic device has completed. In some examples, the user may be presented with an option to approve or disapprove transition to local execution of the application.

In some examples, when transition to local execution of the application 314 is ready to begin, the application management module 110 may send a communication 316 to the storage management module 130 to request application state information. In response, in some cases, the storage management module 130 may obtain and send application state information 318 indicating the current state of the application 306 executing on the emulator 146. The storage management module 130 may send the application state information 318 to the application management module 110, and the application management module 110 may use the received application state information 318 to start execution of the application 314 at the state in which execution left off at the service computing device 128. In some examples, the application state information may be first saved to the storage devices 132 by the application 306 on the emulator as the application state information 142. In other examples, such as in the case that an API is used by the application management module 110 to obtain the application state, the application state information 318 may be sent to the application management module 110 by either the application 306 or the storage management module 130, depending on the configuration of the API.

The content of the application state information 318 depends at least in part on the particular application that is being executed. Some examples of application state information 318 may include values for various variables used by the applications 306 and 314, values for most recent application settings and graphic user interface configurations, values for recently received user inputs or other user selections, and so forth. Thus, the state of the application may include the stored information to which the application has access at a point in time, essentially creating a snapshot of the application at the point in time.

In some cases, the application state information 318 may be obtained implicitly from the application 306 executed by the emulator 146 by causing the application 306 to save its current state. For instance, some applications are configured to save their current states to an application folder or other persistent location when the applications are sent to background processing. For example, application development frameworks for mobile electronic devices may require that application developers cause certain functions to take place in response to certain conditions, such as causing an application to save its state to a persistent memory location when the application is sent to the background. As one example, the use of a "moveTaskToBack" command (or any other suitable OS command that has a similar effect of moving a process to background processing) may cause the application 306 to save its current state information to a persistent memory location, e.g., as application state information 142 associated with the particular application and which may be saved to the storage devices 132. This application state information 142 may be retrieved subsequently from the application folder or other persistent memory location and sent to the electronic device 102 as the application state information 318.

Alternatively, as another example, the application 306 may be configured by the application developers to save its current state in response to receiving an explicit "save state" command from the storage management module 130, the emulator 146, or other module that is controlling the execution of the application 306 on the service computing device 128. For example, an application developer may configure the application 306 to respond to receipt of a save state command by saving the application state information of the application 306 to a specified location, such as to the storage devices 132 as application state information 142. The application state information 142 may then be retrieved from the specified location and sent to the electronic device 102 as the application state information 318. In some examples, an API may be configured to obtain the application state information 318 from the application 306 on the service computing device 128. For instance, the application management module 110 may use the API to request the state information in response to a user command or module instruction to launch the application 314 locally on the electronic device 102. In some examples, the application management module 110 may send a save state command to the remotely executing application 306, and the application 306 may send the saved state information 318 to the electronic device 102. In other examples, the application management module 110 may communicate with the storage management module 130 and the storage management module 130 may send the save state instruction to the application 306. The storage management module 130 may then send the saved application state information 318 to the electronic device 102.

When the application state information 318 has been received by the electronic device 102, the application management module 110 may cause the application 314 on the electronic device 102 to start up using the application state information 318. For instance, the application 314 may be started using the saved variables, settings, and GUIs that were in place in the application 306 at a point at which execution of the application 306 was suspended on the emulator 306. Accordingly, the user may experience a brief delay while the application 314 on the electronic device 102 starts execution, but the application 314 is restored to the state of the application 306 so that the user may begin using the application 314 at the point at which execution left off on the remotely executing application 306.

In addition, in some cases, execution of the application 306 may be suspended and one of the storage management module 130, the application management module 110, or the application 306 may capture a screen shot of the most recent application GUI of the application 306, e.g., at the point at which execution of the application 306 is suspended on the emulator 146. The screen shot may be presented on the display 128 of the electronic device 102 while the application 314 begins execution locally on the electronic device 102. For instance, in some types of applications, the user may not notice the transition from remote execution to local execution since the application interface 310 presented to the user may appear to remain unchanged during the transition. In still other cases, a screen shot is not presented, and instead the user may view the usual start screen for the application as the application 314 starts on the electronic device 102 and uses the application state information 318 to resume the application state saved from the remote application 306.

Further, in some examples, if the local application 314 fails to initiate properly, the user may continue using the remote application 306 until the local application 314 starts properly on the electronic device 102. Accordingly, in some instances, execution of the application 306 on the emulator 146 is not suspended until the application management module 110 sends a message to the storage management module 130 indicating that the application 314 has started correctly on the electronic device 102 and that the locally executing application 314 is now being used by the user, rather than the remotely executing application 306. Thus, the application management module 110 may control the transition by enabling presentation of the application execution data 308, e.g., via the remote application protocol, until the application 314 has fully started on the electronic device 102, and may then begin presenting the application interface of the locally executing application 314 instead.

Figure 4:
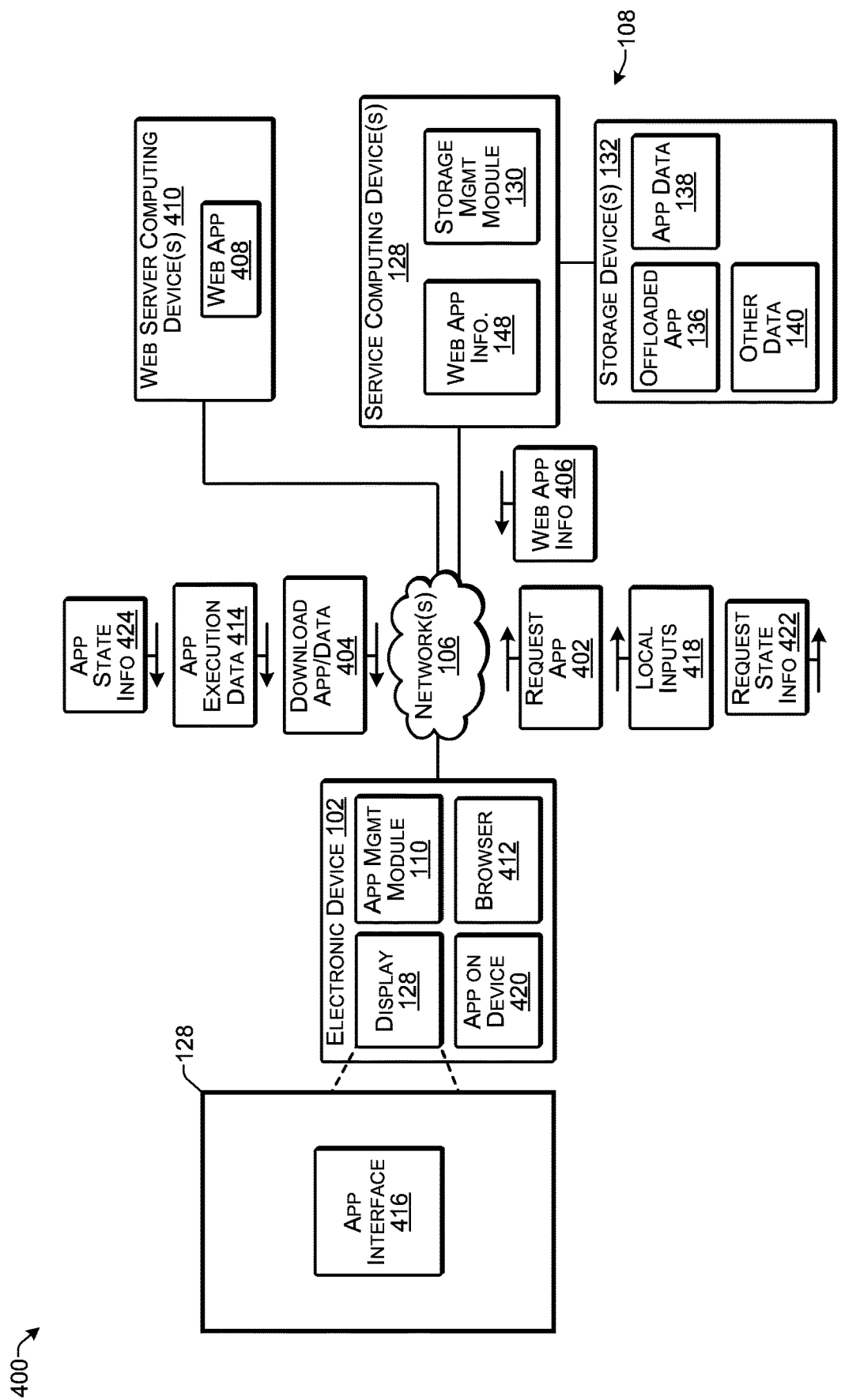
FIG. 4 illustrates an example system for using an application remotely and locally according to some implementations.

FIG. 4 illustrates an example system 400 that may correspond, at least in part, to the system 100 discussed above according to some implementations. For instance, the system 400 may enable remote execution of a web application version of an application while the application is downloaded and installed for local execution on the electronic device 102. In this example, suppose that the user has invoked execution of an application on the electronic device 102, such as by tapping on an icon as discussed above with respect to FIG. 2, or using any other suitable technique for initiating execution of an offloaded application that has been offloaded from the electronic device 102. In response, the application management module 110 may send a request 402 for the application to the service computing device 128 requesting that the corresponding offloaded application 136 to be sent to the electronic device 102. In response, as indicated at 404, the storage management module 130 may download or otherwise send the offloaded application 136 and the associated application data 138 for the offloaded application 136 to the electronic device 102.

In addition, as indicated at 406, the storage management module 130 may send, to the electronic device 102, the web application information 148 previously determined for the particular offloaded application 136. For instance, as discussed above, the storage management module 130 may determine a web application 408 that corresponds to the offloaded application 136. As one example, the web application 408 may be available on a web server computing device 410 accessible over the one or more networks 106. When the offloaded application 136 is initially offloaded from the electronic device 102 to the network storage 108, the storage management module 130 may search for a corresponding web application and save the web application 408 and/or a link to the web application 408 as the web application information 148 associated with the offloaded application 136. For instance, the storage management module 130 may store a link to the web application 408, such as a URL (uniform resource locator) of the web application 408, or the like. Alternatively, the storage management module 130 may download the web application 408 to the service computing device 128 prior to receiving the request 402 for the offloaded application 136 from the electronic device 102. Accordingly, in some examples the web application 408 may be executed at the web server computing device 410, while in other examples, the web application 408 may be executed at the service computing device 128.

The web application 408 may typically be executed through a browser 412 on the electronic device 102. For instance, the web application 408 may be created using a browser-supported programming language, such as one or more of HTML, JavaScript, CSS (cascading style sheets), or the like. Furthermore, the browser 410 may render the web application GUIs and other application information based on application execution data 414 received from remote execution of the web application 408 at either the web server computing device 410 or the service computing device 128.

When the user wants to use the particular application 136 that has been offloaded, the application management module 110 on the electronic device 102 may receive the web application information 406 from the service computing device 128, open the browser 412, and direct the browser 412 to the web application at the service computing device 128 or at the web server computing device 410. As the web application 408 executes, the application execution data 414 is sent to the browser 412 and the browser renders an application interface 416 on the display 128 of the electronic device 102. The user and/or the electronic device 102 may interact with the application interface 416, and the resulting local inputs 418 may be sent by the browser 412 to the web application 408 as application inputs, which may result in additional application execution data 414 being sent to the browser 412 by the web application 408.

After the offloaded application 136 and associated application data 138 have finished downloading to the electronic device 102, the application management module 110 may install the application on the electronic device 102 as a local application 420 on the device. After the application 420 has been installed on the electronic device 102, the application management module 110 may be ready to transition from execution of the web application 408 to local execution of the application 420 on the electronic device 102. Accordingly, the application management module 110 may send a request 422 for application state information. As discussed above, the application management module 110 may use an appropriate API or other suitable technique for obtaining the application state information from the web application 408. In some examples, the web application 408 may be designed by developers to be able to provide current application state information 424 in response to a request submitted via an API or other request.

One of the web application 408, the web server 410, or the service computing device 128 may send the application state information 424 to the electronic device 102, depending at least in part on how the web application 408 is configured and/or where the web application 408 is executed. When the application state information 424 has been received by the electronic device 102, the application management module 110 may cause the application 420 on the electronic device 102 to start up using the application state information 424. For instance, the application 420 may be started using the saved variables, settings, and GUIs that were in place in the web application 408 when the state information was obtained from the web application 408. Accordingly, the user may experience a brief delay while the application 420 on the electronic device 102 starts execution, but the application 420 may be started according to the state of the web application 408 so that the user may begin using the application 420, e.g., at a point at which execution left off on the web application 408.

In addition, in some cases, execution of the web application 408 may be suspended and the storage management module 130, the application management module 110, or the browser 412 may capture a screen shot of the most recent application GUI of the web application 408, e.g., at the point at which execution of the web application 408 is suspended. The screen shot may be presented on the display 128 of the electronic device 102 while the application 420 begins execution locally on the electronic device 102. For instance, in some types of applications, the user may not notice the transition from web application execution to local execution since the application interface 416 presented to the user may appear to remain unchanged during the transition. In still other cases, a screen shot is not presented, and instead the user may view the usual start screen for the application 420 as the application 420 starts on the electronic device 102 and uses the application state information 424 to resume the application state obtained from the web application 408.

Further, such as in case that the local application 420 fails to initiate properly, the user may continue using the web application 408 until the local application 420 starts properly on the electronic device 102. Accordingly, in some instances, execution of the web application 408 is not suspended until the application management module 110 closes the browser 412 and/or sends a message to the web application 408 indicating that execution of the web application should cease, such as when the locally executing application 420 is executing locally and ready to be used. Thus, the application management module 110 may control the transition by enabling presentation of the application execution data 414 in browser 412 until the application 420 has started on the electronic device 102, and may then close the browser 412 and begin presenting the application interface of the locally executing application 420 instead.

Figure 5:
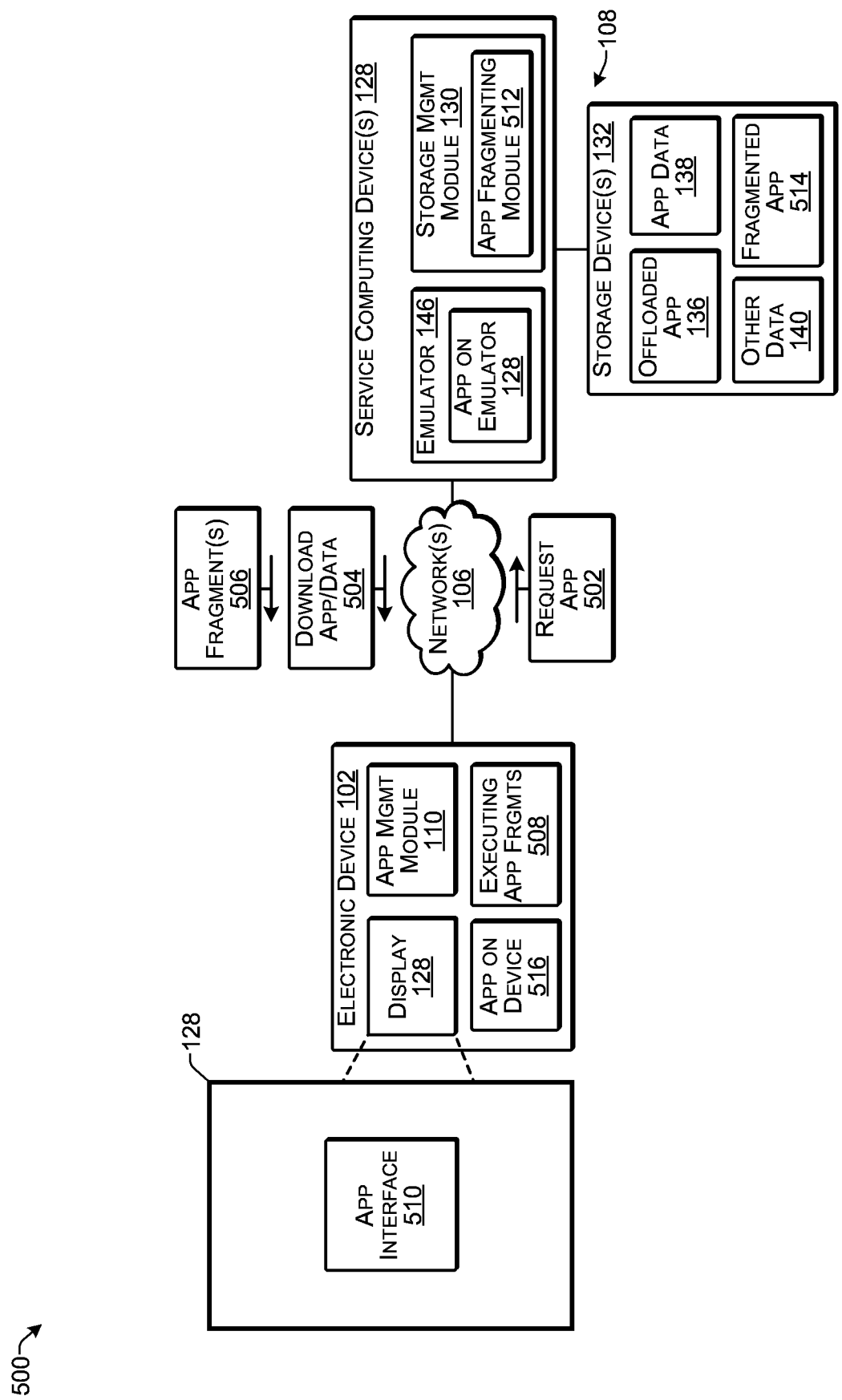
FIG. 5 illustrates an example system for using fragments of an application according to some implementations.

FIG. 5 illustrates an example system 500 that may correspond, at least in part, to the system 100 discussed above according to some implementations. For instance, the system 500 may enable fragmenting of an application and downloading individual fragments of the application that are predicted to be used, while the remainder of the application is being downloaded and installed for local execution on the electronic device 102. In this example, suppose that the user has invoked execution of an offloaded application 136 on the electronic device 102, such as by tapping on an icon as discussed above with respect to FIG. 2, or using any other suitable technique for initiating execution of the application 136 that has been offloaded from the electronic device 102. In response, the application management module 110 may send a request 502 for the offloaded application 136 to the service computing device 128 requesting that the corresponding offloaded application 136 be sent to the electronic device 102. In response, as indicated at 504, the storage management module 130 may download or otherwise send the offloaded application 136 and the associated application data 138 for the offloaded application 136 to the electronic device 102.

In addition, as indicated at 506, the storage management module 130 may send, to the electronic device 102 one or more application fragments 506. As indicated at 508, the electronic device 102 may receive and execute the one or more application fragments while the application and associated application data is being downloaded to the electronic device 102. Accordingly, the execution of the application fragments 508 may generate an application interface 510 that may be interacted with by the user while the remainder of the application and application data is being downloaded. Additional fragments may be downloaded to the electronic device 102 based on the likelihood of being the next invoked fragment of the application. Thus, in some cases, the fragmenting of the application may change the way the application is organized so that some portions of the application can be executed without all of the application being present.

As one example, when the application 136 is initially offloaded to the network storage 108, an application fragmenting module 512 may fragment the application into a plurality of application fragments that may be executed individually and independently of each other by the electronic device 102 to enable execution of a portion of the application locally before the whole application has been downloaded to the electronic device 102. For instance, the application fragmenting module 512 may decompose the offloaded application 136 into a plurality of application fragments to generate a fragmented application 514. In some examples, each application fragment may correspond to one or more GUIs, such as activities in an ANDROID™ environment or views in an iOS environment. Application resources or other application assets such as images, texts, videos, audio, 3D models, and the like, may be determined for each GUI, and the application assets to be used for a specific GUI may be included within a corresponding fragment when the fragment is sent to the electronic device 102. The application fragmenting module 512 may also determine any dependency relationships between the fragments. In some examples the application fragmenting module 512 may be part of the storage management module 130 while in other examples, the application fragmenting module 512 may be separate from the storage management module 130.

When decomposing the offloaded application 136 into application fragments, the application fragmenting module 512 can employ the emulator 146 to execute the offloaded application 136 and determine the GUIs and associated application assets for each fragment of the offloaded application 136. Additionally, or alternatively, the offloaded application 136 may be decomposed into fragments using crowdsourced device processing. For instance, a plurality of electronic devices 102 associated with a plurality of users that have the application 136 stored locally can execute the application 136 and determine the user interfaces and resources for each fragment of the application 136. Furthermore, this technique may also be used to determine which fragments of the application 136 are most likely to be used first by the users, which fragments are most likely to be used next by the users, the probability of use of each fragment during the first several minutes of use of the application, and so forth, to determine the probabilities that particular fragments will be used and the order of use of each fragment of the application. The fragmenting information collected from the user devices can be provided to the application fragmenting module 512, which may use the fragmenting information to decompose the application into fragments, and to assign an order in which the fragments may be downloaded to the electronic device 102 in response to receiving the application request 502.

Accordingly, the offloaded application 136 can be launched on the user's electronic device 102 by sending one of more application fragments 506 to the electronic device 102 for execution while the application and associated application data is downloaded to the electronic device 102. Additional fragments may be sent to the electronic device 102 in an order based on predicted order of use of the fragments determined as discussed above, such as based on access patterns of a plurality of users of the application, and dependency of fragments on previously executed fragments. As one example, if the user is currently active on fragment 4, and if either fragments 5 or 6 are typically accessed immediately after fragment 4, then fragments 5 and 6 may be sent next to the electronic device 102.

In some examples, the entire fragmented application 514 may be sent to the electronic device 102 and installed as the application 516 on the device for local execution. In such a case, a transition following completion of downloading of the fragment application 514 may not be necessary. Alternatively, the original offloaded application 136 may be sent to the electronic device 102, and when the offloaded application 136 has been downloaded and reinstalled as the application 516 on the device 102, the application management module 110 may transition from execution of the application fragments to execution of the application 516 on the device. In this case, the application management module 110 may obtain the application state information from the currently executing application fragment 508. As one example, the application state information may be obtained by pushing the executing application fragment 508 into the background as a background process, as discussed above. This may cause the executing application fragment 508 to save its current application state. The application management module 110 may then use the saved application state when starting up the application 516 on the electronic device 102. Further, similar to the other examples discussed above, a screenshot may be presented to the user in some examples when transitioning from execution of the application fragments to execution of the application 516 on the device.

Additionally, in the case that the non-fragmented version of the application is downloaded to the electronic device 102, it may not be necessary for the application fragmenting module 512 to fully fragment the entire application. For example, the application fragmenting module 512 may only fragment the application sufficiently to generate several fragments that are sufficient for a minute or two of execution until the original offloaded application can be downloaded and reinstalled on the electronic device 102.

As still another alternative, following fragmentation of the offloaded application 136 into a plurality of fragments, the storage management module 130 may send one or more of the application fragments to the electronic device 102 in advance of receiving the request 502 for the application. For example, the fragments may be sufficiently small (e.g., smaller than a threshold storage size) so as to not use a large amount of storage capacity, as compared with the entire offloaded application. Accordingly, when the user attempts to invoke the application on the electronic device 102, one or more of the application fragments 508 may already be present on the electronic device 102 to enable the application fragment(s) to be executed immediately rather than having to be downloaded from the service computing device 128. As another alternative, in the web application examples discussed above with respect to FIG. 4, the web application 408 may be executed by fragmenting the web application 408 based on activity and executing the activities through the browser 412, and the first several fragments predicted to be used by a user may be maintained at the service computing device 128.

Figure 6:
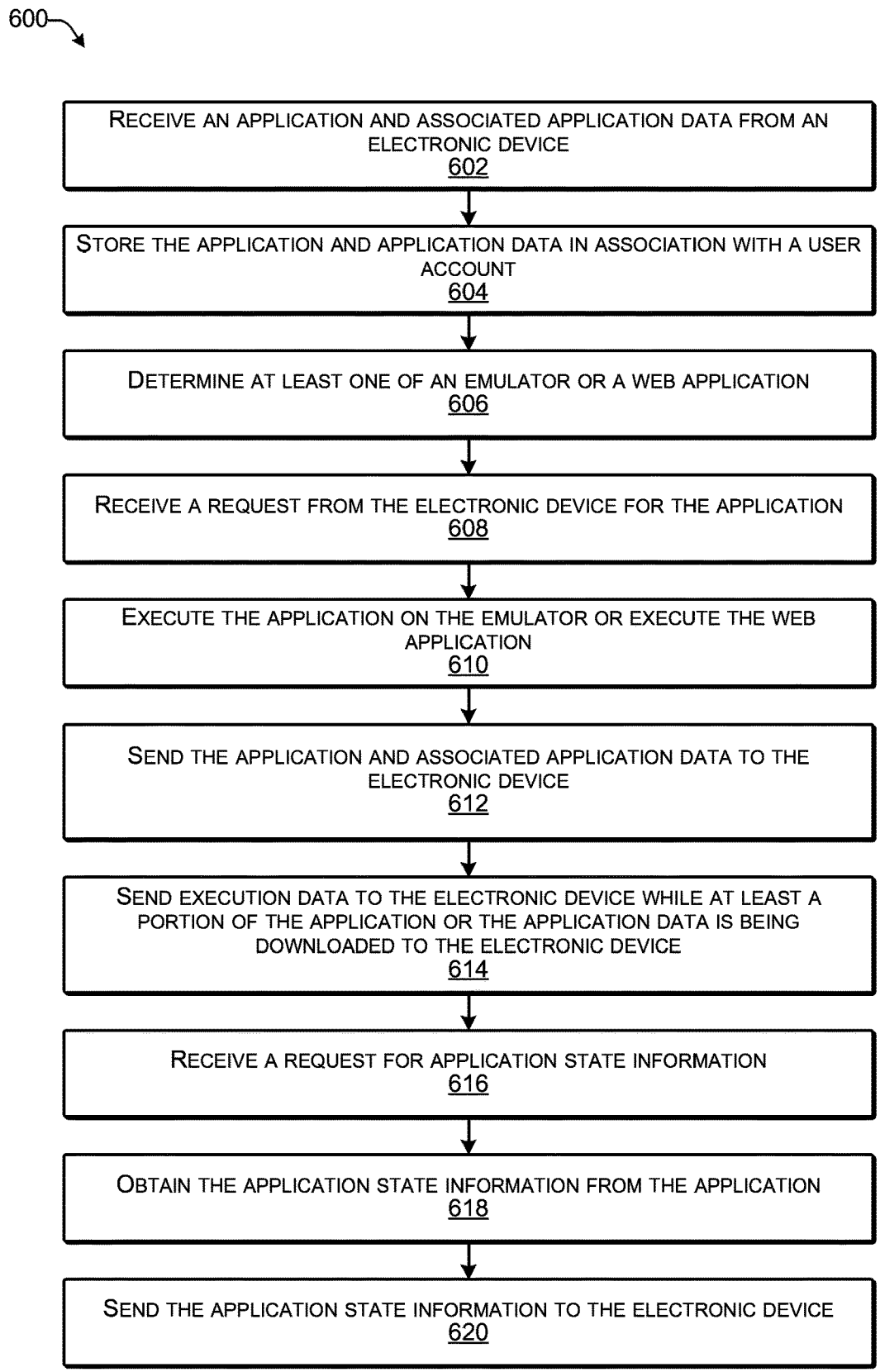
FIG. 6 is a flow diagram illustrating an example process for managing applications on a computing device according to some implementations.
Figure 7:
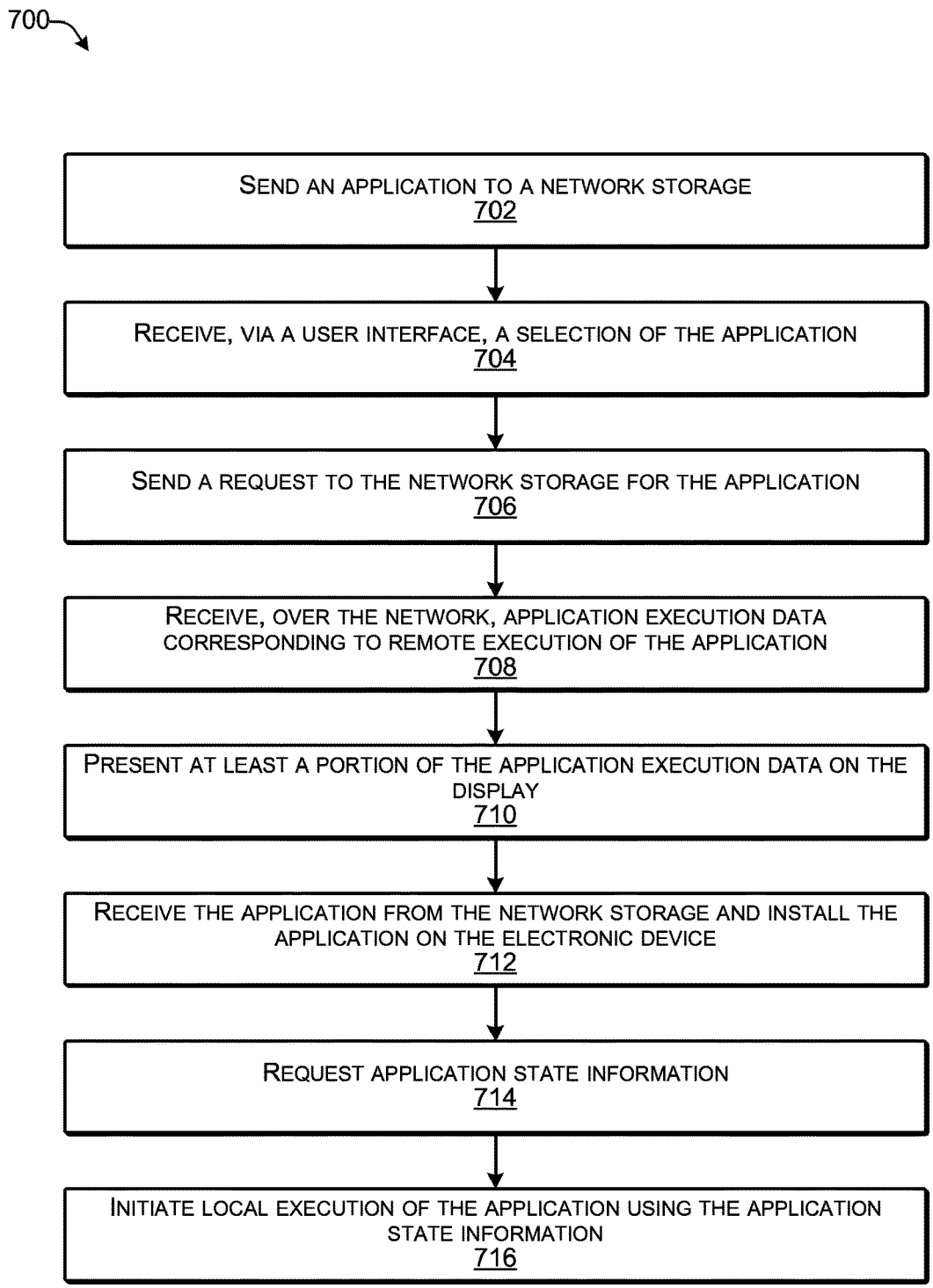
FIG. 7 is a flow diagram illustrating an example process for managing applications on an electronic device according to some implementations.
Figure 8:
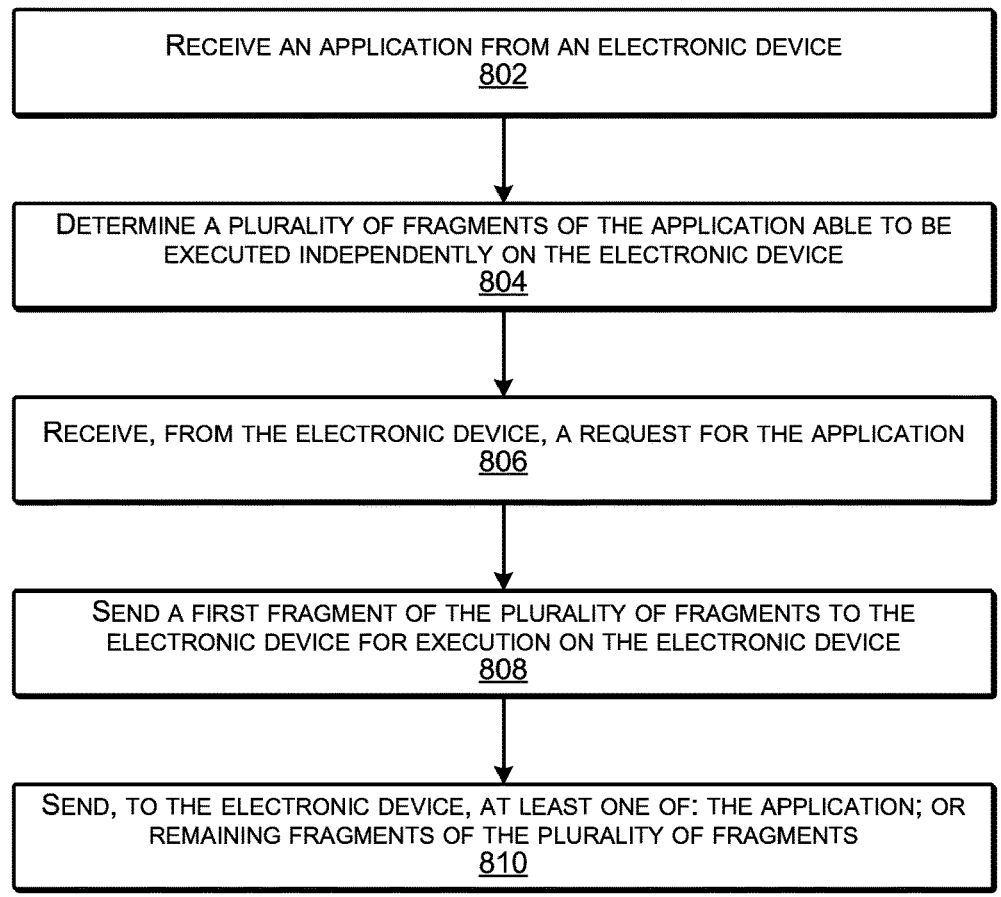
FIG. 8 is a flow diagram illustrating an example process for using application fragments according to some implementations.

FIGS. 6-8 are flow diagrams illustrating example processes for managing applications according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

FIG. 6 is a flow diagram illustrating an example process 600 for application management according to some implementations. In some examples, the process may be executed by the service computing device 128 or by another suitable computing device.

At 602, the computing device receives an application and associated application data from an electronic device. For instance, the electronic device may offload the application and application data to the network storage to increase storage availability on the electronic device.

At 604, the computing device stores the application and application data in association with a user account. For example, the user and/or the electronic device may be associated with a user account, such as a cloud storage account or the like.

At 606, the computing device may determine at least one of an emulator or a web application. In the case of an emulator, the computing device may determine that an emulator is available that can execute the offloaded application in an environment that is similar to that of the electronic device 102. In the case of a web application, the computing device may search for a web application version of the offloaded application, and may determine a link to the web application, or may download the web application for execution at the computing device.

At 608, the computing device may receive a request from the electronic device for the application. For example, the user may attempt to execute the application on the electronic device, which may cause the electronic device to request the offloaded application from the computing device.

At 610, the computing device may execute the application on the emulator or executes the web application. As one example, the computing device may use the emulator to execute the application. In some cases, the computing device may first ascertain device information about the electronic device making the request to ensure that an appropriate emulator is used. As another example, the computing device may execute the web application, which may communicate with a browser on the electronic device. As still another example, the computing device may send network location information to the electronic device to provide the URL or other network location of the web application to thereby cause execution of the web application on a web server computing device.

At 612, the computing device may send, to the electronic device, the application and associated application data. For instance, the offloaded application and associated data may be downloaded to the electronic device.

At 614, the computing device may send execution data to the electronic device while at least a portion of the application or the application data is being downloaded to the electronic device. For example, the electronic device may receive the application execution data and may present one or more GUIs with which the user may interact while the application is being downloaded to the electronic device.

At 616, the computing device may receive a request for application state information. Following download of the application to the electronic device, and installation of the application, the application may be ready for transition from remote execution to local execution. Accordingly, a request may be received for the application state of the remotely executing application.

At 618, the computing device may obtain the application state information from the application. In some examples, the computing device may obtain the application state explicitly, such as by using a save state command. In other examples, the state may be obtained implicitly, such as by sending the application to background processing.

At 620, the computing device may send the application state information to the electronic device. Further, in some examples, the computing device may suspend or otherwise end execution of the application after obtaining the application state information.

FIG. 7 is a flow diagram illustrating an example process 700 for application management according to some implementations. In some examples, the process may be executed by the electronic device 102 or by another suitable computing device.

At 702, the electronic device may send an application to a network storage. For example, the electronic device may determine to send the application to a computing device at the network storage based at least in part on at least one of: an amount of time since the application was last accessed on the electronic device; a frequency with which the application was accessed over a period of time; an amount of storage space consumed by the application; or an amount of available storage space remaining on the electronic device.

At 704, the electronic device may receive, via a user interface, a selection of the application. For example, the user may attempt to invoke execution of the offloaded application on the electronic device.

At 706, the electronic device may send a request to the network storage for the application. Upon determining that the application has been offloaded, the electronic device may request download of the application to the electronic device from the network storage.

At 708, the electronic device may receive, over the network, application execution data corresponding to remote execution of the application. For example, the request may cause the application to be executed remotely, e.g., on an emulator or via a web application version of the application. Thus, the electronic device may receive application execution data while the application is also being downloaded to the electronic device.

At 710, the electronic device may present at least a portion of the application execution data on the display. For instance, the application execution data received from the remotely executing application may include one or more GUIs or other application data that may be presented on the display and with which the user may interact. In some examples, a remote desktop protocol or other remote application protocol may be used to present the application execution data.

At 712, the electronic device may receive the application from the network storage and install the application on the electronic device.

At 714, the electronic device may request application state information. When the application has been installed locally, the execution of the application may be ready for transition from remote execution to local execution.

At 716, the electronic device may initiate local execution of the application using the application state information. Upon receipt of the application state information, the electronic device may use the state information when starting the application locally to cause the local application to resume execution at a state at which the remotely executing application saved the state information.

FIG. 8 is a flow diagram illustrating an example process 800 for application management according to some implementations. In some examples, the process may be executed by the service computing device 128 or by another suitable computing device.

At 802, the computing device may receive an application from an electronic device. For instance, the electronic device may offload the application and application data to the network storage to increase storage availability on the electronic device.

At 804, the computing device may determine a plurality of fragments of the application able to be executed independently on the electronic device. For example, the computing device may decompose the application, such as by running the application on an emulator, and/or by collecting data from a plurality of users of the application to determine particular user interfaces of the application that are most likely to be presented or otherwise used first by a user.

At 806, the computing device may receive, from the electronic device, a request for the application.

At 808, the computing device may send a first fragment of the plurality of fragments to the electronic device for execution on the electronic device. For instance, the fragment may enable the electronic device to present a first GUI to the user that would typically be presented if the application were to be opened normally on the electronic device.

At 810, the computing device may send, to the electronic device, at least one of: the application; or remaining fragments of the plurality of fragments. In some cases, the entire application may be fragmented and the fragments may be downloaded to the electronic device. In other cases, only a portion of the application might be fragmented, and the non-fragmented version of the application may be downloaded to the electronic device. In the second case, execution of the application from the fragments to the non-fragmented version may include a transition and matching the execution states, as discussed above.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 9:
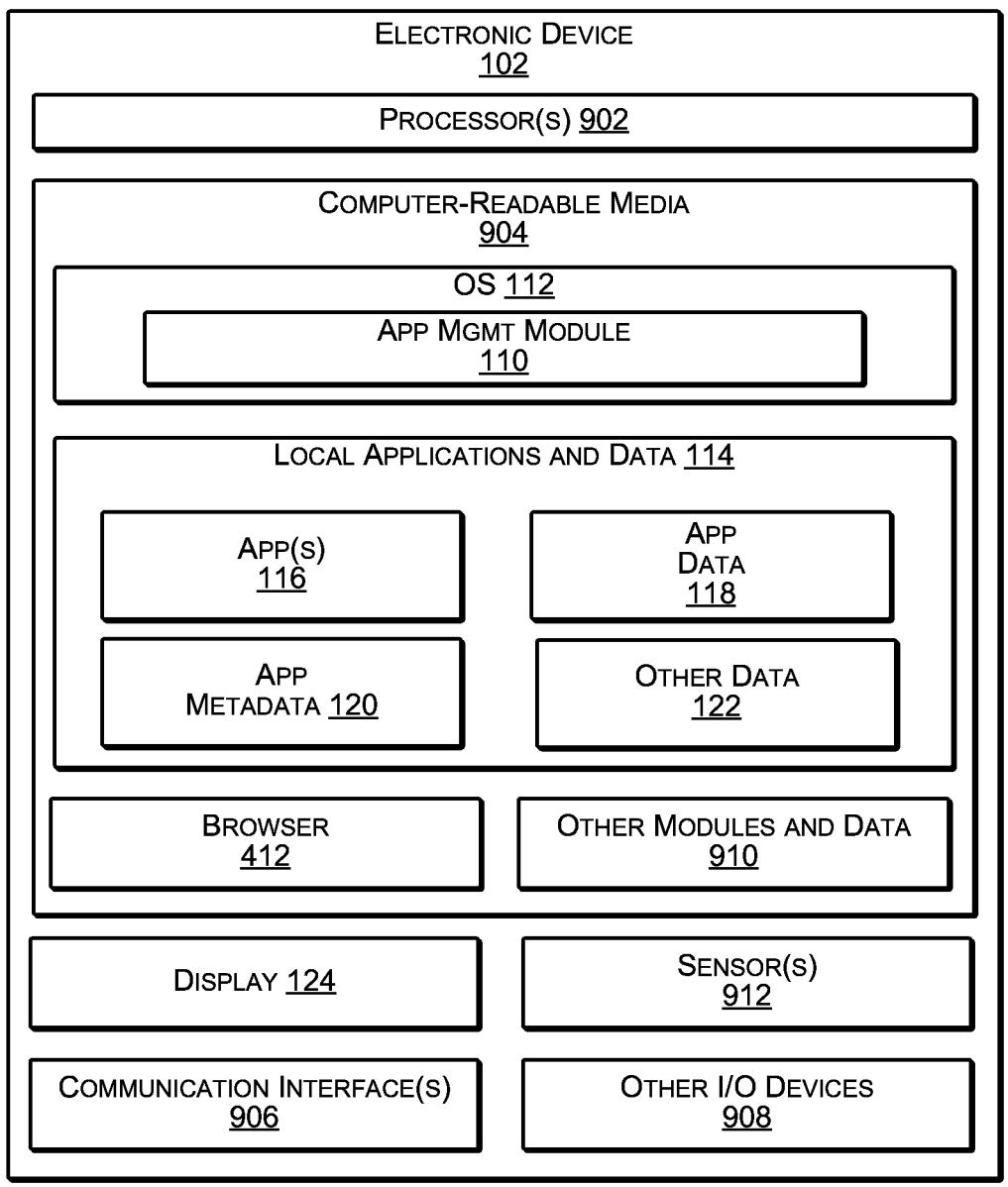
FIG. 9 illustrates select components of an example electronic device according to some implementations.

FIG. 9 illustrates select example components of the electronic device 102 that may implement the functionality described above according to some examples. The electronic device 102 may be any of a number of different types of computing devices, as enumerated above. In the example of FIG. 9, the electronic device 102 includes a plurality of components, such as at least one processor 902, one or more computer-readable media 904, the one or more communication interfaces 906, and one or more input/output (I/O) devices 908. Each processor 902 may itself comprise one or more processors or processing cores. For example, the processor 902 can be implemented as one or more microprocessors, microcomputers, microcontrollers, digital signal processors, central processing units, state machines, logic circuitries, and/or any devices that manipulate signals based on operational instructions. In some cases, the processor 902 may be one or more hardware processors and/or logic circuits of any suitable type specifically programmed or configured to execute the algorithms and processes described herein. The processor 902 can be configured to fetch and execute computer-readable processor-executable instructions stored in the computer-readable media 904.

Depending on the configuration of the electronic device 102, the computer-readable media 904 may be an example of tangible non-transitory computer storage media and may include volatile and nonvolatile memory and/or removable and non-removable media implemented in any type of technology for storage of information such as computer-readable instructions, data structures, program modules, or other data. The computer-readable media 904 may include, but is not limited to, RAM, ROM, EEPROM, flash memory, solid-state storage, magnetic disk storage, optical storage, and/or other computer-readable media technology. Further, in some cases, the electronic device 102 may access external storage, such as RAID storage systems, storage arrays, network attached storage, storage area networks, cloud storage, or any other medium that can be used to store information and that can be accessed by the processor 902 directly or through another computing device or network. Accordingly, the computer-readable media 904 may be computer storage media able to store instructions, modules, or components that may be executed by the processor 902. Further, when mentioned, non-transitory computer-readable media exclude media such as energy, carrier signals, electromagnetic waves, and signals per se.

The computer-readable media 904 may be used to store and maintain any number of functional components that are executable by the processor 902. In some implementations, these functional components comprise instructions or programs that are executable by the processor 902 and that, when executed, implement operational logic for performing the actions attributed above to the electronic device 102. Functional components of the electronic device 102 stored in the computer-readable media 904 may include the application management module 110 and the browser 412, as discussed above. Additional functional components may include the operating system 112 for controlling and managing various functions of the electronic device 102 and for enabling basic user interactions with the electronic device 102. In some examples, the application management module 110 may be one or more modules of the operating system 112, while in other examples, some or all of these modules may be separate from the operating system 112.

The computer-readable media 904 may store the local application data, such as application(s) 116, application data 118, application metadata 120, and other data 122. In addition, depending on the type of the electronic device 102, the computer-readable media 904 may also store other functional components and data, such as other modules and data 910, which may include applications, programs, drivers, etc., and other data used or generated by the functional components. Further, the electronic device 102 may include many other logical, programmatic and physical components, of which those described are merely examples that are related to the discussion herein.

The communication interface(s) 906 may include one or more interfaces and hardware components for enabling communication with various other devices, such as over the network(s) 106 or directly. For example, communication interface(s) 906 may enable communication through one or more of the Internet, cable networks, cellular networks, wireless networks (e.g., Wi-Fi) and wired networks, as well as close-range communications such as BLUETOOTH®, and the like, as additionally enumerated elsewhere herein.

FIG. 9 further illustrates that the electronic device 102 may include the display 124. Depending on the type of computing device used as the electronic device 102, the display 124 may employ any suitable display technology. For example, the display 124 may be a liquid crystal display, a plasma display, a light emitting diode display, an OLED (organic light-emitting diode) display, an electronic paper display, or any other suitable type of display able to present digital content thereon. In some examples, the display 124 may have a touch sensor (not shown) associated with the display 124 to provide a touchscreen display configured to receive touch inputs for enabling interaction with a GUI presented on the display 124. Accordingly, implementations herein are not limited to any particular display technology. Alternatively, in some examples, the electronic device 102 may not include a display.

The electronic device 102 may further include sensors 912, such as a GPS device, an accelerometer, gyroscope, compass, proximity sensor, and the like. The electronic device 102 may further include one or more other I/O devices 908. The I/O devices 908 may include speakers, a microphone, a camera, and various user controls (e.g., buttons, a joystick, a keyboard, a keypad, etc.), a haptic output device, and so forth. Additionally, the electronic device 102 may include various other components that are not shown, examples of which may include removable storage, a power source, such as a battery and power control unit, and so forth.

Figure 10:
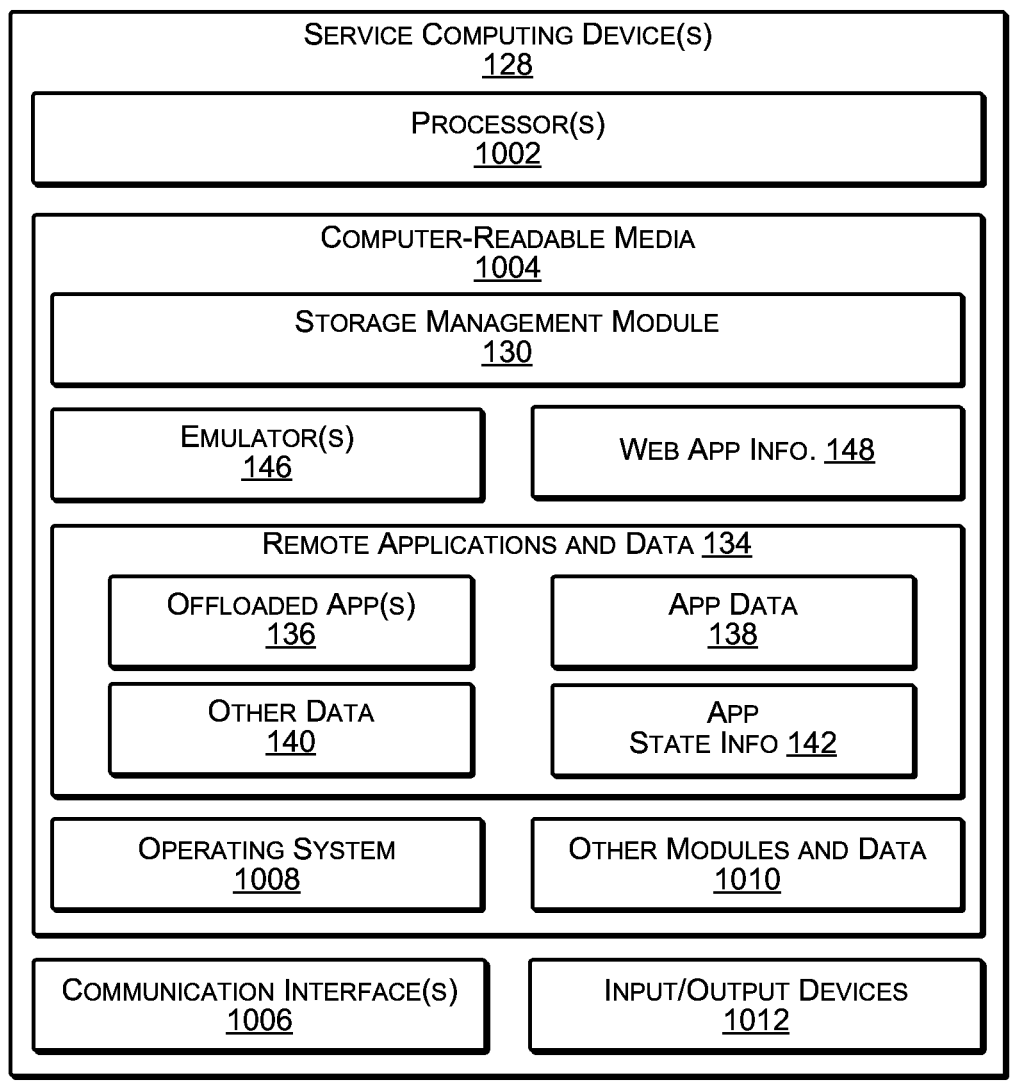
FIG. 10 illustrates select components of one or more example service computing devices according to some implementations.

FIG. 10 illustrates select components of the one or more service computing device(s) 128 that may be used to implement some functionality of the application management service described herein. In some examples, the service computing device 128 may be operated by a service provider that provides the network storage service, and may include one or more servers or other types of computing devices that may be embodied in any number of ways. For instance, in the case of a server, the modules, other functional components, and data storage (e.g., storage devices 132) may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the service computing device 128 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 128 may be located together or separately, and organized, for example, as virtual servers, server banks, and/or server farms. The described functionality may be provided by the servers of a single entity or enterprise, or may be provided by the servers and/or services of multiple different buyers or enterprises.

In the illustrated example, each service computing device 128 may include, or may have associated therewith, one or more processors 1002, one or more computer-readable media 1004, and one or more communication interfaces 1006. Each processor 1002 may be a single processing unit or a number of processing units, and may include single or multiple computing units or multiple processing cores. The processor(s) 1002 can be implemented as one or more microprocessors, microcomputers, microcontrollers, digital signal processors, central processing units, state machines, logic circuitries, and/or any devices that manipulate signals based on operational instructions. For instance, the processor(s) 1002 may be one or more hardware processors and/or logic circuits of any suitable type specifically programmed or configured to execute the algorithms and processes described herein. The processor(s) 1002 can be configured to fetch and execute computer-readable instructions stored in the computer-readable media 1004, which can program the processor(s) 1002 to perform the functions described herein.

The computer-readable media 1004 may include the storage devices 132 discussed above with respect to FIG. 1. In some cases, the storage devices 132 may be at the same location as the service computing device(s) 128, while in other examples, the storage devices 132 may be remote from the service computing device(s) 128. The computer-readable media 1004 may further include volatile and nonvolatile memory and/or removable and non-removable media implemented in any type of technology for storage of information, such as computer-readable instructions, data structures, program modules, or other data. Such computer-readable media 1004 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 128, the computer-readable media 1004 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 1004 may be used to store any number of functional components that are executable by the processors 1002. In many implementations, these functional components comprise instructions or programs that are executable by the processors 1002 and that, when executed, specifically configure the one or more processors 1002 to perform the actions attributed above to the service computing device 128. Functional components stored in the computer-readable media 1004 may include the storage management module 130, the emulator(s) 146 and, in some cases, one or more web applications and/or the application fragmenting module (not shown in FIG. 10). Additional functional components stored in the computer-readable media 1004 may include an operating system 1008 for controlling and managing various functions of the service computing device 128.

In addition, the computer-readable media 1004 may store data used for performing the functions and services described herein. Thus, the computer-readable media 1004 may store the remote applications and data 134, which may include the offloaded applications 136, application data 138, other data 140, and in some cases application state information 142. The service computing device 128 may also include or maintain other functional components and data, such as other modules and data 1010, which may include application fragments in some examples, programs, drivers, etc., and the data used or generated by the functional components. Further, the service computing device 128 may include many other logical, programmatic, and physical components, of which those described above are merely examples that are related to the discussion herein.

The communication interface(s) 1006 may include one or more interfaces and hardware components for enabling communication with various other devices, such as over the network(s) 106. For example, communication interface(s) 1006 may enable communication through one or more of the Internet, cable networks, cellular networks, wireless networks (e.g., Wi-Fi) and wired networks, as well as close-range communications such as BLUETOOTH®, and the like, as additionally enumerated elsewhere herein.

The service computing device 128 may further be equipped with various input/output (I/O) devices 1012. Such I/O devices 1012 may include a display, various user interface controls (e.g., buttons, joystick, keyboard, mouse, touch screen, etc.), audio speakers, connection ports and so forth.

Various instructions, methods, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A computing device comprising:
   one or more processors; and
   one or more computer-readable media storing instructions executable by the one or more processors, wherein the instructions program the one or more processors to:
   receive an application program and associated application data from an electronic device that has uninstalled the application program from the electronic device;
   receive a request from the electronic device for the application program;
   execute the application program using an emulator to obtain execution data that includes one or more graphical user interfaces, wherein the emulator emulates, at least in part, execution of the application program on the electronic device, the one or more graphical user interfaces being generated by the execution of the application program on the emulator;
   send the application program and the associated application data to the electronic device in response to the request;
   send the execution data including the one or more graphical user interfaces to the electronic device during a period in which at least one of a portion of the application program or a portion of the associated application data are sent to the electronic device; and send application state information to the electronic device to cause, at least in part, the electronic device to synchronize the application program on the electronic device with the application program on the emulator at least one of during or after presentation of the one or more graphical user interfaces on the electronic device.

2. The computing device as recited in claim 1, wherein the instructions further program the one or more processors to send the application state information to the electronic device, the application state information indicating a state of the application program executed using the emulator, the application state information including additional application data generated by execution of the application program using the emulator.

3. The computing device as recited in claim 2, wherein the instructions further program the one or more processors to obtain the application state information by:
   moving the application program executing using the emulator to a background processing condition to cause the application program to save the application state information to a non-transitory computer-readable medium; and
   obtaining the application state information from the non-transitory computer-readable medium.

4. The computing device as recited in claim 2, wherein the instructions further program the one or more processors to:
   receive a request for the application state information from the electronic device; and
   obtain the application state information by sending an instruction to the application program to instruct the application program to provide the application state information.

5. The computing device as recited in claim 1, wherein the instructions further program the one or more processors to:
   in response to receiving the request for the application program from the electronic device, determine device information related to the electronic device, the device information comprising at least one of: a device type of the electronic device; a brand of the electronic device; a model of the electronic device; a processor of the electronic device; a memory size of the electronic device; or an operating system of the electronic device; and
   select the emulator based at least in part on the device information.

6. A method comprising:
   receiving a request from an electronic device for an application previously uninstalled and sent from the electronic device;
   causing execution of the application remotely from the electronic device to obtain application execution data that includes one or more graphical user interfaces, the one or more graphical user interfaces being generated by the execution of the application;
   sending the application to the electronic device in response to the request;
   sending the application execution data including the one or more graphical user interfaces to the electronic device, wherein the one or more graphical user interfaces generated by the execution of the application and at least a portion of the application are sent to the electronic device concurrently; and
   sending application state information to the electronic device to cause, at least in part, the electronic device to synchronize the application on the electronic device with the application executed remotely at least one of during or after presentation of the one or more graphical user interfaces on the electronic device.

7. The method as recited in claim 6, wherein the causing execution of the application remotely from the electronic device further comprises:
   executing or causing execution of a web application corresponding to the application, wherein the sending of the application execution data comprises sending, by the web application, the application execution data to a browser at the electronic device.

8. The method as recited in claim 7, further comprising:
   prior to receiving the request, determining a network location of the web application based at least in part on receiving the application from the electronic device; and
   saving information about the network location associated with the web application.

9. The method as recited in claim 8, wherein the causing execution of the application remotely from the electronic device further comprises:
   sending the information about the network location to the electronic device, wherein the web application is executed at a web server that communicates with the browser of the electronic device.

10. The method as recited in claim 7, further comprising:
    prior to receiving the request, determining a network location of the web application based at least in part on receiving the application from the electronic device; and
    downloading the web application.

11. The method as recited in claim 7, further comprising:
    receiving a request for the application state information from the electronic device;
    obtaining the application state information from the web application; and
    sending the application state information to the electronic device.

12. The method as recited in claim 6, wherein the causing execution of the application remotely from the electronic device further comprises:
    executing the application using an emulator to obtain the application execution data, wherein the emulator emulates, at least in part, execution of the application on the electronic device.

13. The method as recited in claim 12, further comprising:
    receiving a request for the application state information from the electronic device;
    causing processing of the application on the emulator to move to a background processing condition to cause the application to save the application state information; and
    sending the application state information to the electronic device.

14. The method as recited in claim 6, further comprising:
    receiving a request for the application state information from the electronic device;
    obtaining the application state information by sending an instruction to the application to instruct the application to provide the application state information; and
    sending the application state information to the electronic device.

15. An electronic device comprising:
    a display;
    one or more processors coupled to the display; and
    one or more computer-readable media storing instructions executable by the one or more processors, wherein the instructions program the one or more processors to:

send an application that has been uninstalled to a computing device over a network;

receive, via a user interface presented on the display, a selection of a user interface item corresponding to the application;

send a request to the computing device for the application in response to the received selection;

receive, over the network, the application from the computing device;

receive, over the network, application execution data that includes one or more graphical user interfaces generated by remote execution of the application;

present at least a portion of the one or more graphical user interfaces on the display while the application is being received and reinstalled on the electronic device;

receive, over the network, application state information; and based at least in part on the application state information, synchronize execution of the application on the electronic device with the remote execution of the application at least one of during or after presentation of at least the portion of the one or more graphical user interfaces on the electronic device.

16. The electronic device as recited in claim 15, wherein the instructions further program the one or more processors to:

install the application on the electronic device; and send a request for the application state information.

17. The electronic device as recited in claim 16, wherein the instructions further program the one or more processors to:

initiate execution of the application on the electronic device using at least a portion of the application state information.

18. The electronic device as recited in claim 15, wherein the instructions further program the one or more processors to:

obtain a screen shot of a graphic user interface corresponding to the received application execution data; and present the screen shot of the graphic user interface on the display during startup of the application on the electronic device.

19. The electronic device as recited in claim 15, wherein the instructions further program the one or more processors to:

execute a browser on the electronic device; and receive the application execution data via the browser.

20. The electronic device as recited in claim 15, wherein the instructions further program the one or more processors to determine to send the application to the computing device based at least in part on at least one of:

an amount of time since the application was last accessed on the electronic device;

a frequency with which the application was accessed over a period of time;

an amount of storage space consumed by the application; or an amount of available storage space remaining on the electronic device.

21. A computing device comprising:

one or more processors; and one or more computer-readable media storing instructions executable by the one or more processors, wherein the instructions program the one or more processors to:

receive an application from an electronic device that has uninstalled the application from the electronic device;

determine a plurality of fragments of the application by decomposing the application into a plurality of executable portions corresponding to different parts of the application, each fragment of the application being able to be executed independently on the electronic device;

receive, from the electronic device, a request for the application;

send, in response to the request, a first fragment of the plurality of fragments of the application to the electronic device for execution on the electronic device; and send, to the electronic device in response to the request, a non-fragmented version of the application after the first fragment of the application is sent and while the first fragment of the application is being executed on the electronic device.

22. The computing device as recited in claim 21, wherein the instructions further program the one or more processors to determine an order of the plurality of fragments to send to the electronic device based at least in part on determining a likely order of execution of the fragments.

23. The computing device as recited in claim 22, wherein the instructions further program the one or more processors to determine the plurality of fragments based at least in part on using an emulator to execute the application, wherein the emulator emulates, at least in part, execution of the application on the electronic device.

* * * * *